US012701371B2

(12) United States Patent
Merkl et al.

(10) Patent No.: US 12,701,371 B2
(45) Date of Patent: Aug. 4, 2026

(54) HEARING INSTRUMENT AND ASSOCIATED BINAURAL HEARING SYSTEM

(71) Applicant: Sivantos Pte. Ltd., Singapore (SG)

(72) Inventors: Tobias Merkl, Erlangen (DE); Pascal Schreiber, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 162 days.

(21) Appl. No.: 18/644,399

(22) Filed: Apr. 24, 2024

(65) Prior Publication Data

US 2024/0357297 A1 Oct. 24, 2024

(30) Foreign Application Priority Data

Apr. 24, 2023 (DE) ..................... 10 2023 203 769.6

(51) Int. Cl.
*H04R 25/00* (2006.01)

(52) U.S. Cl.
CPC ......... *H04R 25/552* (2013.01); *H04R 25/554* (2013.01); *H04R 25/602* (2013.01); *H04R 25/604* (2013.01); *H04R 25/65* (2013.01); *H04R 2225/025* (2013.01); *H04R 2225/31* (2013.01); *H04R 2225/51* (2013.01)

(58) Field of Classification Search
CPC .. H04R 25/552; H04R 25/554; H04R 25/602; H04R 25/65; H04R 2225/025; H04R 2225/31; H04R 25/60; H04R 25/402; H04S 25/604
USPC ........................................ 381/312, 322, 324
See application file for complete search history.

(56) References Cited

U.S. PATENT DOCUMENTS

2016/0050474 A1 2/2016 Rye et al.

FOREIGN PATENT DOCUMENTS

| | | | | |
|---|---|---|---|---|
| CH | 681125 A5 | 1/1993 | | |
| CN | 216751213 U | 6/2022 | | |
| DE | 1117650 A | 11/1961 | | |
| DE | 102021210075 A1 | 10/2022 | | |
| EP | 4164251 A2 | 4/2023 | | |
| WO | WO-2022260242 A1 | * | 12/2022 | .............. H04R 1/08 |

* cited by examiner

*Primary Examiner* — George C Monikang
(74) *Attorney, Agent, or Firm* — Laurence A. Greenberg; Werner H. Stemer; Ralph E. Locher

(57) ABSTRACT

A hearing instrument includes a housing wearable in an ear of a user and having a concha portion, a thin canal portion protruding from the concha portion, a receiver and a mechanically rigidly connected electronics unit including a battery, a signal processor and two microphones. The electronics unit is accommodated in the concha portion such that, in the intended wearing position of the hearing instrument, an upper side of the electronics unit faces away from the head of the user and a lower side of the electronics unit faces the head of the user. Each microphone is disposed on the upper side of the electronics unit, centered relative to a horizontal plane aligned approximately parallel to the transverse plane of the head of the user in the wearing position and intersects the concha portion of the housing centrally. A binaural hearing system is also provided.

8 Claims, 7 Drawing Sheets

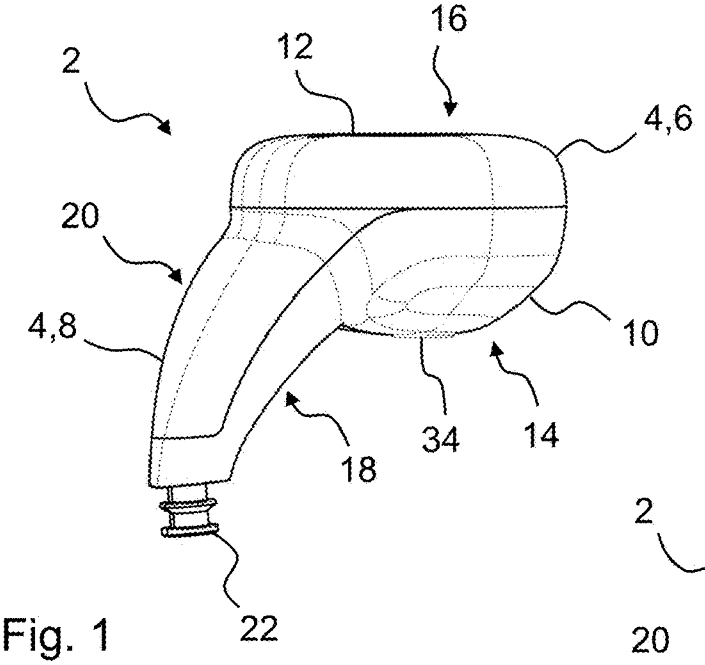
Fig. 1
Fig. 2
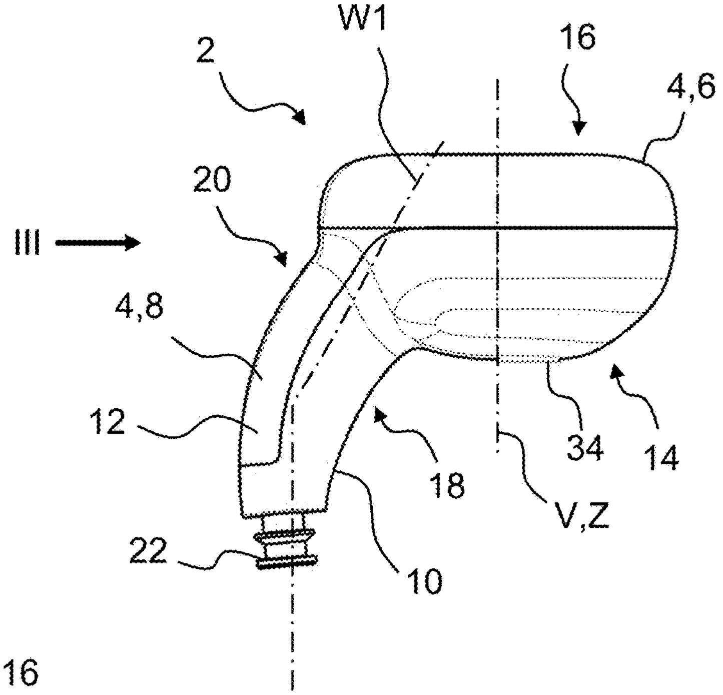
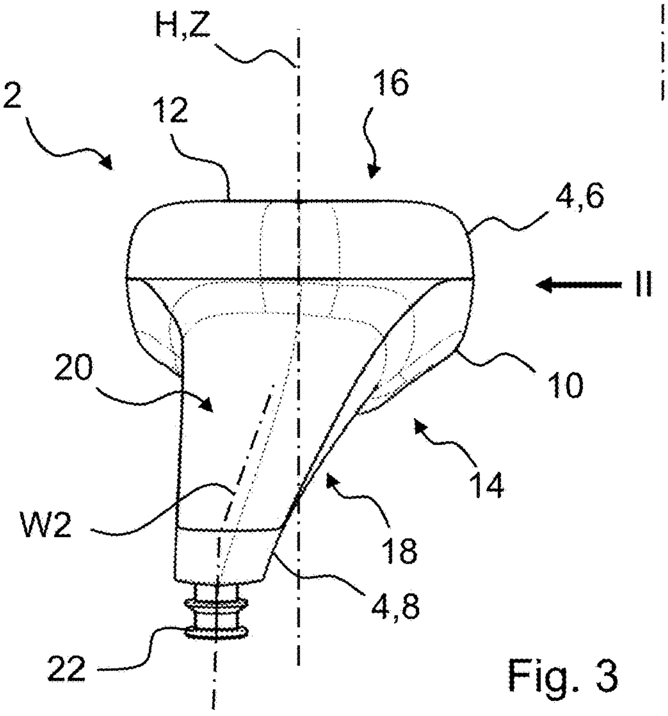
Fig. 3

Fig. 13
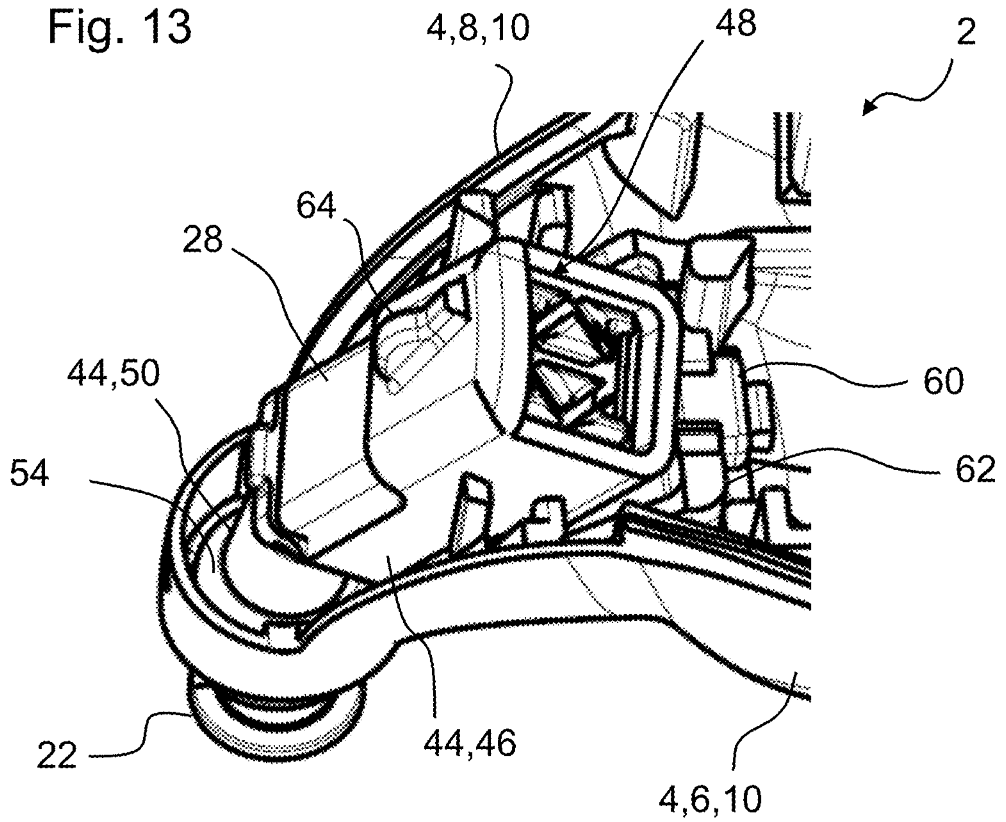
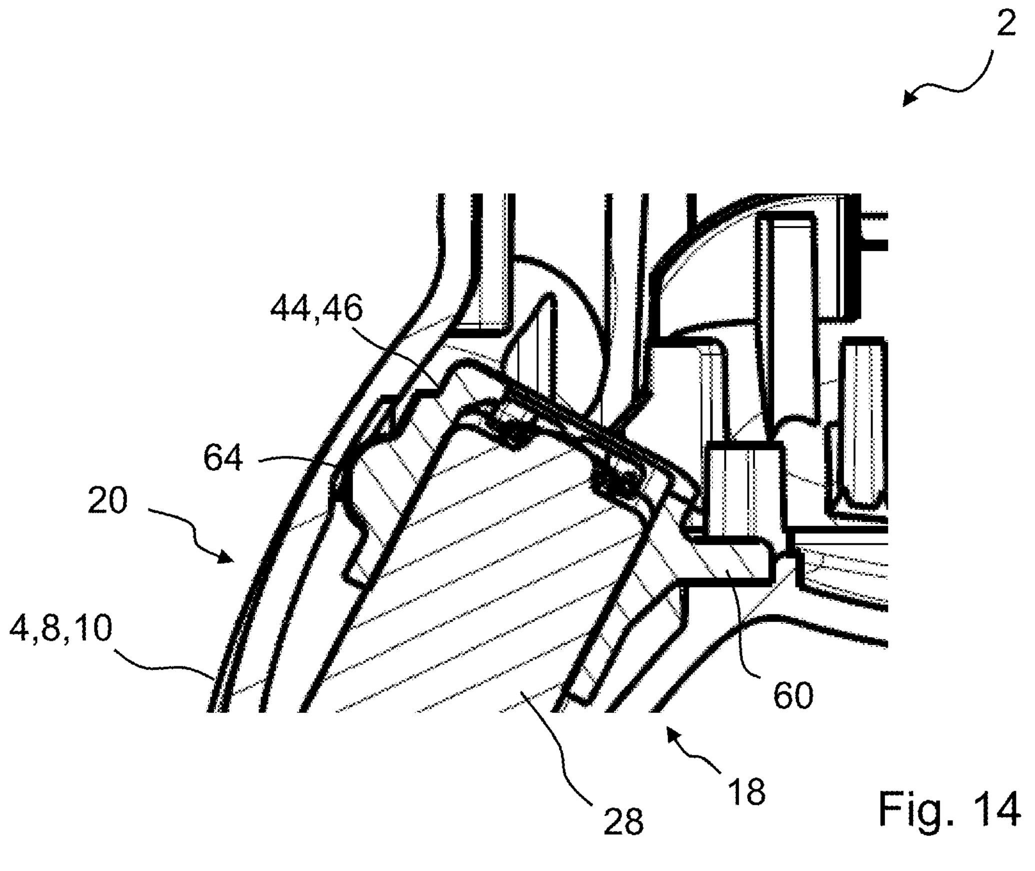
Fig. 14

HEARING INSTRUMENT AND ASSOCIATED BINAURAL HEARING SYSTEM

CROSS-REFERENCE TO RELATED APPLICATION

This application claims the priority, under 35 U.S.C. § 119, of German Patent Application DE 10 2023 203 769.6, filed Apr. 24, 2023; the prior application is herewith incorporated by reference in its entirety.

FIELD AND BACKGROUND OF THE INVENTION

The invention relates to a hearing instrument having a housing which is wearable in an ear of a user and which comprises a concha portion and a thin canal portion protruding from the concha portion. The invention also relates to an associated binaural hearing system.

A hearing instrument generally refers to an electronic device that assists a person wearing the hearing instrument (who is referred to as "wearer" or "user" below) with hearing. In particular, the invention relates to hearing instruments that are configured to fully or partly compensate for a loss of hearing of a hearing-impaired user. Such a hearing instrument is also referred to as "hearing aid." Additionally, there are hearing instruments that protect or improve the ability of users with normal hearing to hear, for example enable improved speech comprehension in complex hearing situations. Such hearing instruments are also referred to as personal sound amplification products (PSAP). Additionally, the term "hearing instrument" also includes headphones with active noise suppression (especially so-called earplugs, i.e., headphones worn within the ear), headsets, etc.

Hearing instruments in general, and specifically hearing aids, are usually designed to be worn on the head of the user and, in particular, in or on an ear in this case, in particular as behind-the-ear devices (BTE devices) or in-the-ear devices (ITE devices). The present invention relates to the latter style of hearing instruments, i.e., ITE devices. Such ITE devices frequently have a housing with a bulging (often approximately hemispherical) housing main part and a thin housing extension (often shaped like an arm) protruding therefrom. In this context, the bulging housing main part is adapted to be worn in the concha and is therefore also referred to here as "concha portion" of the housing. By contrast, the thin housing extension is designed to reach into the auditory canal (canal) and is therefore also referred to here as "canal portion".

In terms of their internal structure, hearing instruments of the type described above regularly comprise at least one (acousto-electric) input transducer, a signal processing unit (signal processor), and an output transducer. During the operation of the hearing instrument, the input transducer or each input transducer records airborne sound from the surroundings of the hearing instrument and converts this airborne sound into an input audio signal (i.e., an electric signal, which transports information about the ambient sound). The input audio signal or each input audio signal is processed in the signal processing unit (i.e., modified in terms of its sound information) in order to assist the ability of the user to hear, in particular to compensate for a loss of hearing of the user. The signal processing unit outputs an appropriately processed audio signal to the output transducer. In some applications the signal processing additionally outputs the input audio signal in original or modified form to an external electronic device (peripheral device, e.g., a further hearing instrument or a smartphone of the user) and/or receives a further input audio signal from the peripheral device. The data transfer between the hearing instrument and the peripheral device is regularly implemented wirelessly, e.g., using Bluetooth technology, in modern hearing instruments. Modern hearing instruments therefore often also comprise an antenna for wireless transmission and reception of data.

In most cases, the output transducer is in the form of an electro-acoustic transducer, which converts the (electric) output audio signal back into airborne sound, wherein this airborne sound—which is being modified in relation to the ambient sound—is output into the auditory canal of the user. Such electro-acoustic transducers are also referred to as "receivers".

In recent times, increasing numbers of hearing instruments are produced with a rechargeable battery. In this case, the battery is recharged either wirelessly or by means of a galvanic charging connector. In general, a charging connector refers to a piece of electric equipment for supplying a charging current, i.e., an electric current for charging the rechargeable battery of the hearing instrument. In this context, "galvanic" means that, in contrast to wireless charging, the charging connector enables an electric current flow (i.e., an exchange of electrons) between a charging device or charging cable and the hearing instrument.

To be able to provide care for the right or left ear of the user, depending on the user's need, hearing instruments of the same type are usually manufactured in two structural forms which have a mirror-symmetric outer contour. Thus, hearing instruments for the left ear and hearing instruments for the right ear must be manufactured separately and differently. As a rule, internal structures must also be manufactured differently, especially mirror symmetrically, in hearing instruments for the left ear and hearing instruments for the right ear.

Moreover, hearing instruments are often produced and sold as a part of a binaural hearing system for caring for both ears of the user. Such a binaural hearing system comprises a first hearing instrument for the left ear of the user and a second hearing instrument for the right ear of the user.

The need for manufacturing constituent parts of hearing instruments for the left ear and for the right ear differently requires the respective separate manufacture of a large number of different constituent parts within the production of hearing instruments, and hence great production outlay.

SUMMARY OF THE INVENTION

The invention is based on the object of simplifying the production of hearing instruments and binaural hearing systems.

This object is achieved according to the invention by the features recited below. Advantageous embodiments and developments, some of which are inventive on their own, are presented in the dependent claims and the following description.

The hearing instrument comprises a housing which is wearable in an ear of a user and divided into a concha portion and a thin canal portion protruding from the concha portion. In particular, the concha portion has a bulging shape to fit the typical shape of a human concha. The canal portion preferably has a twice curved shape (in different planes) to fit the typical anatomy of the human auditory canal. By preference, the hearing instrument is a standard device (one-size-fits-all device) which is offered to many users with the same housing shape. However, deviating therefrom, the hearing instrument may in principle also be an individually fit hearing instrument, in which the shape of the concha portion and of the canal portion is accurately fitted to the specific shape of the concha and of the auditory canal of the individual user.

The hearing instrument also comprises a battery, a signal processor, at least two microphones, and a receiver (i.e., an electro-acoustic output transducer).

At least the battery, the signal processor, and the microphones are arranged in a mechanically rigidly connected electronics unit accommodated in the concha portion. The receiver by contrast is preferably accommodated at least partially in the canal portion separately (and in mechanically decoupled fashion) from the electronics unit. In other words, the receiver is preferably arranged in the canal portion (in full or in part), in such a way that it is not directly (immediately) mechanically connected to the electronics unit.

The side of the electronics unit that faces away from the head of the user in the intended wearing position of the hearing instrument in the ear of the user is referred to as the "upper side" of the electronics unit in the following text. The side of the electronics unit which is opposite this upper side and faces the head of the user in the intended wearing position of the hearing instrument is referred to accordingly as the "lower side" of the electronics unit.

According to the invention, each of the two microphones is arranged on the upper side of the electronics unit, in each case here in centered fashion with respect to a horizontal plane. Thus, in particular, the microphones are arranged in such a way on the electronics unit in this case that the horizontal plane intersects a sound inlet of the respective microphone centrally. The "horizontal plane" of the concha portion and the electronics unit placed therein refers to a plane which is aligned roughly parallel (i.e., exactly or approximately parallel) to the transverse plane of the head of the user in the wearing position of the hearing instrument and which intersects the concha portion of the housing centrally. In anatomy, the transverse plane of the head refers to the plane which is perpendicular to the longitudinal direction of the head and separates the lower half of the head from the upper half of the head. In this context, it is self-evident to a person skilled in the art that an exact alignment of the horizontal plane of the concha portion with the transverse plane of the head is regularly not possible on account of the individual variations in the human anatomy and the play, never entirely avoidable, with which the hearing instrument can be inserted into the ear of the user. Orienting the horizontal plane with respect to the transverse plane of the head is therefore naturally an inexact science. Against this background, the horizontal plane is referred to as approximately parallel to the transverse plane of the head of the user (and hence in accordance with the invention) in particular if it is inclined by up to 20° (preferably by up to) 10° vis-à-vis the transverse plane of the head in the intended wearing position of the hearing instrument in the ear of the user.

As a result of the centered arrangement of the microphones with respect to the horizontal plane on the electronics unit, the electronics unit inserted both in hearing instruments for the right ear and in hearing instruments for the left ear can have an identical construction. In this case, fitting the electronics unit to the right or left ear is limited to a rotation of the electronics unit through 180° about a central axis of the electronics unit formed by the line of intersection between the horizontal plane and the vertical plane. In theory, one and the same electronics unit could be removed from a construction of the hearing instrument designed for the left ear and—following a 180° rotation—be inserted into a construction of the hearing instrument designed for the right ear.

In particular, what the above-described arrangement of the microphones on the electronics unit achieves is that the at least two microphones each adopt an appropriate relative position with respect to the left and right half of the head of the user in the intended wearing position of the hearing instrument in the left or right ear of the user; in the case of a binaural hearing system, the two hearing instruments in the intended wearing position thus in other words have microphone arrangements which are mirror symmetric to one another (specifically reflected in the sagittal plane of the head). In particular, the same microphone (front microphone) of the electronics unit is thus always arranged further to the front, i.e., closer to the face of the user, than the other microphone (back microphone), independently of the wearing position of the hearing instrument on the left or right half of the head.

As a result of arranging the two microphones in the horizontal plane of the electronics unit, a particularly large distance parallel to the sagittal axis of the head (i.e., in the posterior-anterior direction of the head or in the viewing direction of the user) is moreover achieved independently of the side of the head on which the hearing instrument is worn; this is advantageous for a desired directional effect of the microphone arrangement.

As a result of the uniform (i.e., side-independent) design of the electronics unit, the electronics unit and all subcomponents of same need only be manufactured in a single construction in order to equip hearing instruments for the right ear and hearing instruments for the left ear therewith. Since the electronics unit is by far the most complex subunit of the hearing instrument and in respect of the manufacturing outlay the most complicated subunit of the hearing instrument, a significant production simplification is achieved as a result.

In a preferred embodiment of the invention, an antenna for an electromagnetic (and hence wireless) data transfer, e.g., between the hearing instrument and a smartphone and/or between the two hearing instruments of a binaural hearing system, is additionally arranged in the electronics unit. In this case, a base point (i.e., a central feeding point) of the antenna is preferably arranged on the electronics unit in centered fashion with respect to the horizontal plane. This allows the electronics unit comprising the antenna to be used with a comparable transmission and reception characteristic on both sides of the head. In this case, the base point of the antenna is arranged in particular on an edge of the upper side of the electronics unit distant from the canal portion of the housing.

By preference, the battery is a rechargeable battery. In this case, an electrical charging connector for charging the battery (i.e., for galvanic supply of an electric charging current) is additionally arranged on the electronics unit in an expedient configuration. The charging connector, in particular designed as a contact area for resting against a corresponding mating contact area or alternatively as a charging socket for receiving a corresponding charging plug, is preferably arranged in centered fashion with respect to the horizontal plane in this case. By preference, the charging connector is moreover designed axially symmetrically (or, formulated equivalently, rotationally symmetric with respect to a 180° rotation about an axis (located in the horizontal plane) of the charging connector). The side-independent use of the electronics module is promoted by the two aforementioned measures, which may be provided independently of one another or in combination with one another.

A further embodiment of the invention relates to a binaural hearing system. The latter comprises a first hearing instrument for the left ear of the user and a second hearing instrument for the right ear of the user. In this case, the two hearing instruments are formed with a housing that has a mirrored design (in particular with respect to a vertical plane perpendicular to the horizontal plane) but otherwise with (at least substantially) the same design in the manner according to the invention as described above, in particular in the manner of one of the above-described variants of the invention.

According to the invention, the two hearing instruments of the binaural hearing system have identically designed electronics units. In this case, the electronics unit of the first hearing instrument and the electronics unit of the second hearing instrument are in particular inserted in a manner rotated through 180° with respect to one another into the housings of the first and second hearing instrument, respectively, which are arranged mirror symmetrically with respect to one another. In other words, in a preferred embodiment of the invention the electronics unit of the first hearing instrument can be mapped onto the electronics unit of the second hearing instrument by way of a 180° rotation about a central axis that forms the line of intersection of the horizontal plane and the vertical plane, if the housings of the two hearing instruments are arranged mirror symmetrically with respect to one another.

Furthermore, the two hearing instruments preferably also have identically designed receivers.

An exemplary embodiment of the invention is described in more detail below.

BRIEF DESCRIPTION OF THE FIGURES

FIG. 1 shows a perspective illustration at an oblique viewing angle of a hearing instrument wearable in the left ear of a user and having a housing which in terms of its shape is divided into a bulging concha portion and into a thin canal portion protruding from the concha portion, with the housing being assembled from two housing parts, specifically a housing trough facing the head of a user in the wearing position of the hearing instrument and a housing lid distant from the head of a user in the wearing position, FIG. 2 shows the hearing instrument according to FIG. 1 in plan view II (FIG. 3) transversely to a horizontal plane, FIG. 3 shows the hearing instrument according to FIG. 1 in plan view III (FIG. 2) transversely to a vertical plane, FIG. 13 shows a perspective illustration of the canal portion of the hearing instrument according to FIG. 1 with a removed housing lid and the damping body inserted in the canal portion, and the receiver inserted in the damping body, FIG. 14 shows, in an illustration according to FIG. 5, a detailed view of the damping body inserted in the canal portion and of the receiver inserted in the damping body.

Figure 4:
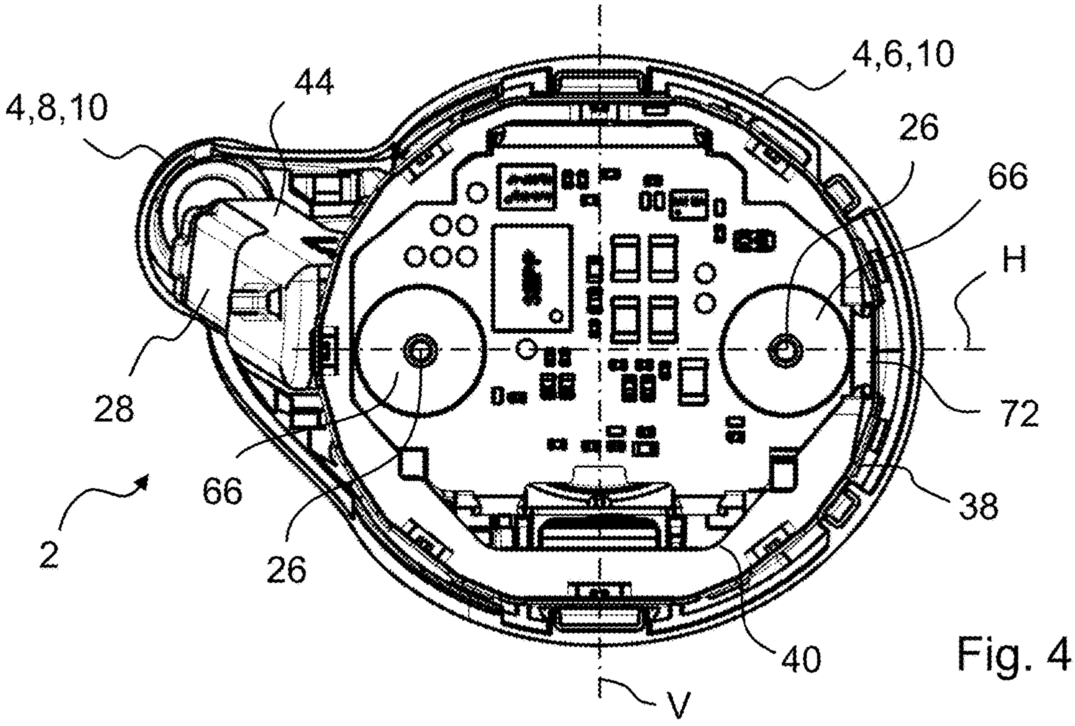
FIG. 4 shows a plan view of an upper side of the hearing instrument from FIG. 1 with a housing lid removed.
Figure 5:
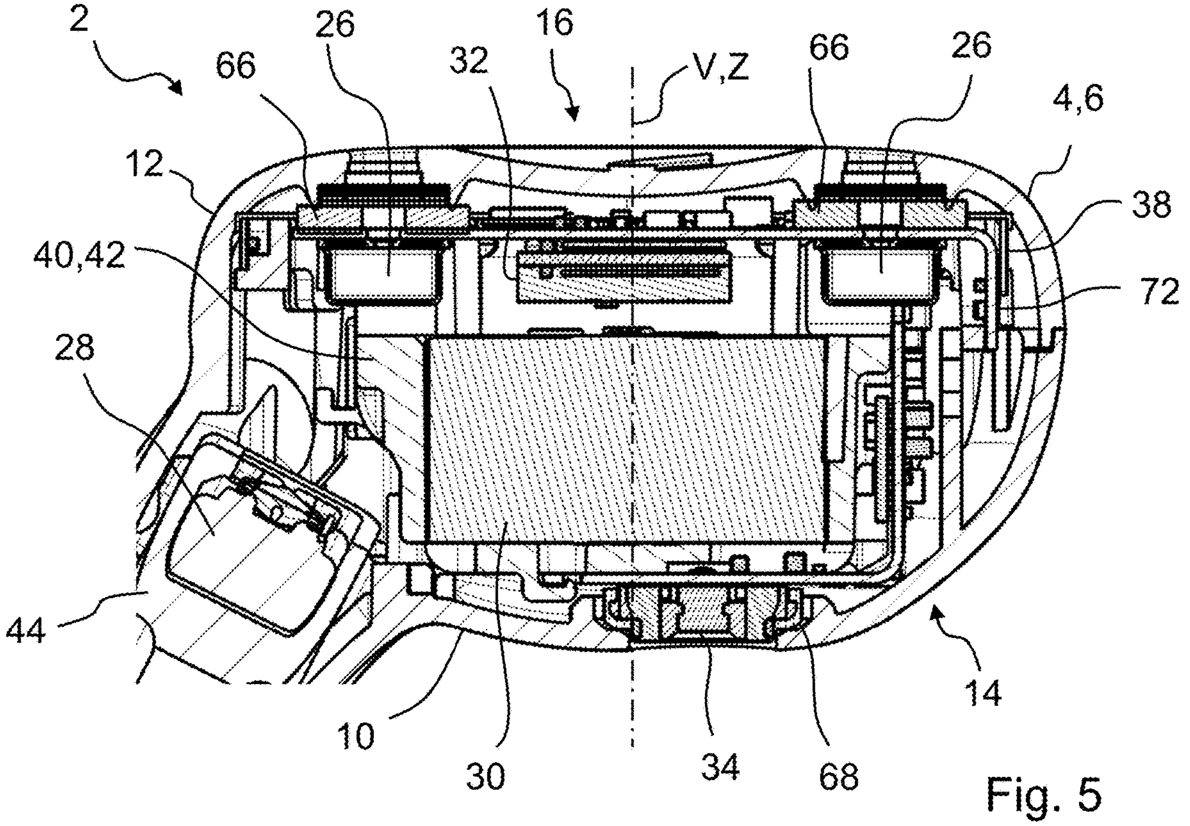
FIG. 5 shows the concha portion of the hearing instrument according to FIG. 1 in a cross section along the horizontal plane.
Figure 6:
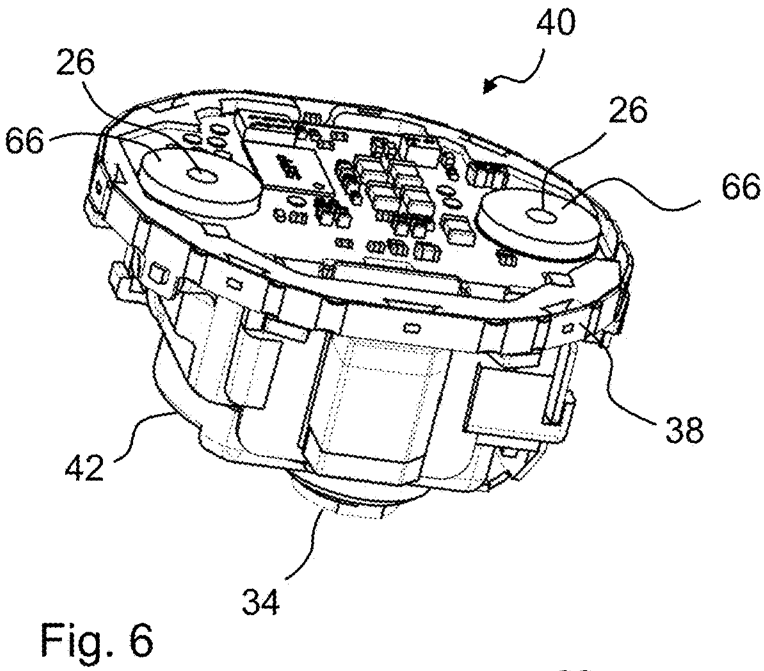
FIG. 6 shows a perspective illustration with a view of an upper side of a mechanically rigidly connected electronics unit of the hearing instrument according to FIG. 1, comprising two microphones, a signal processor, an amplifier, a battery, a galvanic charging connector and an antenna for wireless data transfer with an external electronic device.
Figure 7:
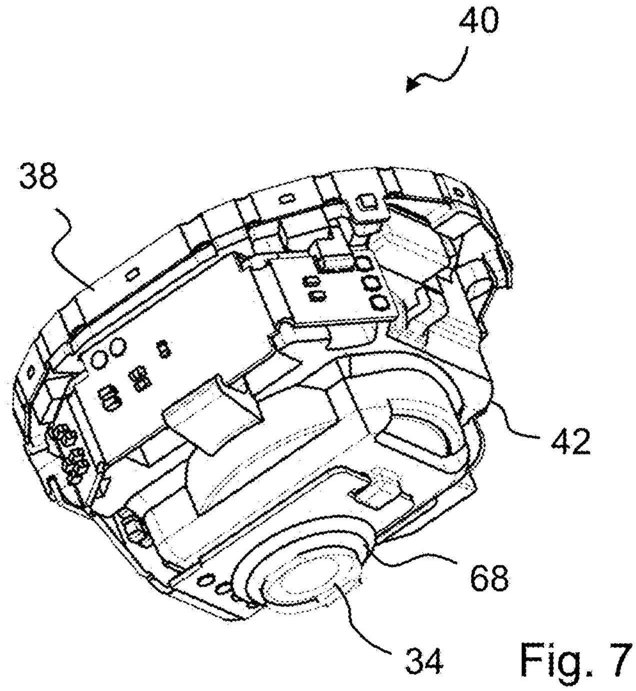
FIG. 7 shows a perspective illustration with a view of a lower side of the electronics unit according to FIG. 6.

Parts and variables corresponding to one another are always provided with the same reference signs in all figures.

DETAILED DESCRIPTION OF THE INVENTION

FIGS. 1 to 14 show a hearing instrument 2 which for example is a hearing aid, i.e., a hearing instrument configured to assist a hearing-impaired user with the ability to hear. In this case, the hearing instrument 2 is embodied as an ITE hearing instrument that is insertable into the ear of a user. The hearing instrument 2 shown in FIGS. 1 to 14 is designed by way of example for insertion in the left ear of the user.

According to FIGS. 1 to 3, the hearing instrument 2 comprises a housing 4 which is divided into a concha portion 6 and a canal portion 8 projecting from the concha portion.

FIG. 2 shows the hearing instrument 2 in a plan view transversely to a horizontal plane H. As evident from FIG. 3, the horizontal plane H intersects the concha portion 6 centrally. In an intended wearing position of the hearing instrument 2 in the ear of the user, the horizontal plane H is aligned approximately parallel to the transverse plane of the head of the user, and hence aligned approximately horizontally with respect to the surrounding space in the case of an upright head position. In anatomy, the transverse plane of the head refers to the plane which is perpendicular to the longitudinal direction of the head and separates the lower half of the head from the upper half of the head.

By contrast, FIG. 3 shows the hearing instrument 2 in a plan view transversely to a vertical plane V. As evident from FIG. 2, the vertical plane V also intersects the concha portion 6 centrally and perpendicular to the horizontal plane H. In the intended wearing position of the hearing instrument 2 in the ear of the user, the vertical plane V is aligned approximately parallel to the coronal plane (also: frontal plane) of the head of the user, and hence aligned approximately vertically with respect to the surrounding space in the case of an upright head position. In anatomy, the coronal or frontal plane of the head refers to the plane which is parallel to the longitudinal direction of the head and separates the front half of the head from the back half of the head. The projection of the horizontal plane H and the vertical plane V respectively shown in FIGS. 2 and 3 also reproduces the position of the line of intersection of these two planes. Below, this line of intersection is also referred to as the central axis Z of the hearing instrument 2.

The concha portion 6 has a bulging shape to fit the typical shape of a human concha. The canal portion 8 has a thin and elongate shape to fit the typical anatomy of the human auditory canal (canal). In accordance with the typical, twice curved shape of the human auditory canal, the canal portion 8 has a first curvature located at least approximately in the horizontal plane H; said first curvature is indicated in FIG. 2 by a first angle W1. Further, the canal portion 8 has a second curvature located at least approximately in the vertical plane V; said second curvature is indicated in FIG. 3 by a second angle W2.

The housing 4 is formed from two assembled housing parts, specifically a housing trough 10 and a housing lid 12. The housing trough 10 forms a lower side 14 of the concha portion 6 which faces the head of the user in the intended wearing position of the hearing instrument 2. By contrast, the housing lid 12 forms an upper side 16 of the concha portion 6 which is distant from the head of the user in the intended wearing position of the hearing instrument 2. Both the housing trough 10 and the housing lid 12 also form a respective side of the canal portion 8. In a manner analogous to the two sides of the concha portion 6, the side of the canal portion 8 formed by the housing trough 10 is referred to as lower side 18 and the side of the canal portion 8 formed by the housing lid 12 is referred to as upper side 20. A connector 22 for connecting an ear dome is also formed on the lower side 18 of the canal portion 8. The ear dome (not depicted here) formed like an umbrella or funnel serves to secure the hearing instrument 2 in the auditory canal and fully or partly acoustically seal the inner auditory canal from the surroundings.

Figure 8:
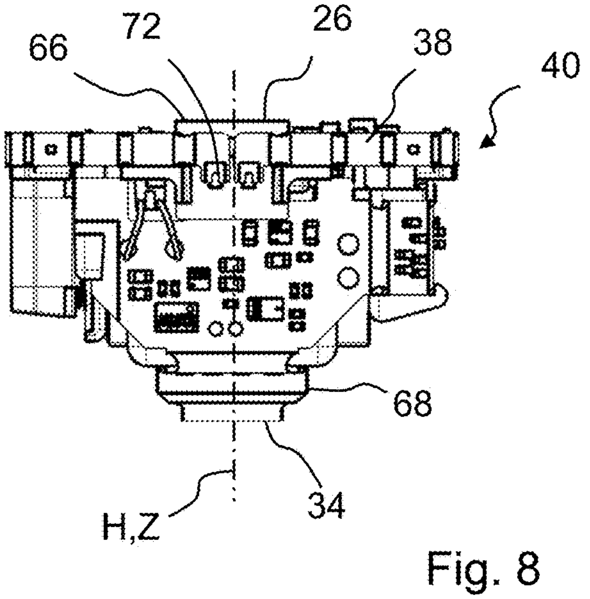
FIG. 8 shows the electronics unit according to FIG. 6 in a plan view transversely to the vertical plane.
Figure 9:
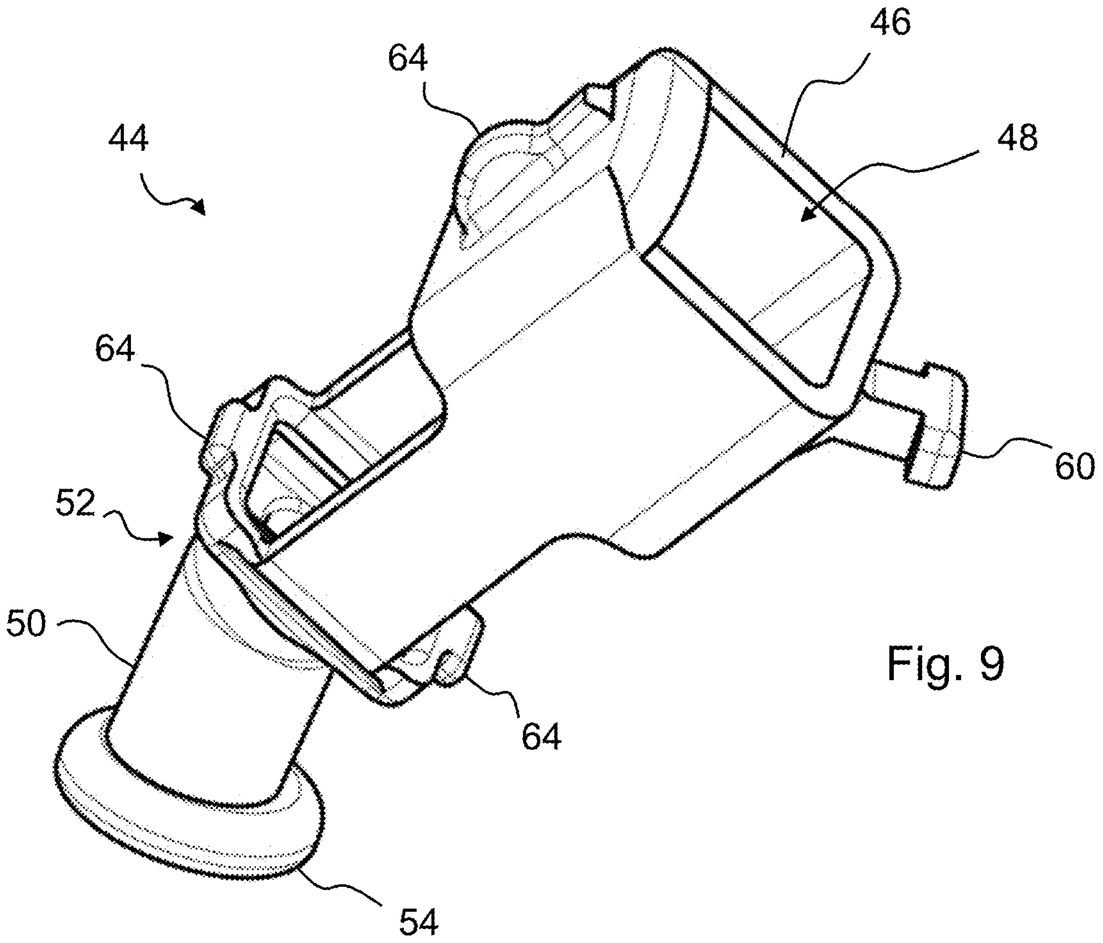
FIG. 9 shows a perspective illustration of a damping body of the hearing instrument according to FIG. 1 for accommodating a receiver.

In the assembled state according to FIGS. 1 to 3, the housing trough 10 and the housing lid 12 are fastened to one another in non-destructively detachable fashion by latching connections 24 (FIGS. 8 and 9).

Within the housing 4, the hearing instrument 2 according to FIGS. 4 to 8 and 13 and 14 comprises two microphones 26 as an input transducer and a receiver 28 as an output transducer. The hearing instrument 2 furthermore comprises a battery 30 and an (in particular digital) signal processor 32. Preferably, the signal processor 32 comprises both a programmable subunit (for example, a microprocessor) and a non-programmable subunit (for example, an ASIC). The signal processor 32 is supplied with a supply voltage from the battery 30.

During normal operation of the hearing instrument 2, the microphones 26 record airborne sound from the surroundings of the hearing instrument 2. The microphones 26 each convert the sound into an (input) audio signal which contains a piece of information about the recorded sound. Within the hearing instrument 2, the input audio signals are fed to the signal processor 32, which modifies these input audio signals to assist the ability of the user to hear. The signal processor 32 outputs an output audio signal, which contains a piece of information about the processed and hence modified sound, to the receiver 28. The receiver 28 converts the output sound signal into modified airborne sound. This modified airborne sound is then output into the auditory canal of the user.

The battery 30 is a rechargeable battery. To recharge the battery 30, the hearing instrument 2 in this case comprises a galvanic charging connector 34. In the example illustrated, this charging connector 34 is formed by a plug-in connector which is connected to an electronic charging controller (not depicted explicitly) of the hearing instrument 2. To charge the battery 30, the hearing instrument 2 is inserted into a corresponding receptacle of a charging device (not depicted here) such that the charging connector 34 of the hearing instrument 2 comes into contact with a corresponding mating plug-in connector of the charging device.

Moreover, within the housing 4, the hearing instrument 2 comprises an antenna which enables a wireless data exchange between the hearing instrument 2 and at least one further electronic device, for example a further hearing instrument and/or a smartphone of the user. The antenna 38 is designed to transmit and receive electromagnetic waves, especially in the GHz range. In this case, the data transfer is preferably implemented on the basis of the Bluetooth standard.

The microphones 26, the battery 30, the signal processor 32, the charging connector 34, the charging controller and the antenna 38 are parts of an electronics unit 40 which is held together by an electronics frame 42 (formed by a plastic part in particular) as a rigid component. The electronics unit 40 also comprises an amplifier (not depicted explicitly), which amplifies the output audio signal output by the signal processor prior to the output by the receiver 28. The electronics unit 40 is inserted in the concha portion 6 of the housing 4 and substantially fills this concha portion 6.

The receiver 28 is not arranged in the electronics unit 40 but is located, spatially and mechanically separated from the latter, in the canal portion 8 of the housing 4. In this case, the receiver 28 is accommodated in a damping body 44 made of an elastic material, which acoustically damps the receiver 28 vis-à-vis the housing 4 and hence suppresses the transmission of the structure-borne sound generated by the receiver 28 (i.e., the mechanical vibration of the receiver 28 when the sound signal is output). The damping body 44 has in particular a hardness (Shore hardness SHA) of between 50 and 70 and for example consists of a fluoroelastomer (e.g., Viton/FKM).

According to FIG. 9, the damping body 44 comprises a pocket 46 into which the receiver 28 has been pushed through an open back longitudinal end 48 (see FIG. 13 in particular). The pocket 46 preferably has slightly smaller dimensions than the receiver 28, and so the receiver 28 is frictionally secured by the elastic material of the pocket 46. In its assembled position in the housing 4, the damping body 44 with the inserted receiver 28 is pushed into the canal portion 8 in such a way that the longitudinal end 48 faces the concha portion 6 (see FIGS. 4 and 11 to 14). In a region distant from the longitudinal end 48, the pocket 46 is provided with two opposing cutouts which face the lower side 18 and upper side of the canal portion 8, respectively, in the assembled position. These cutouts save material, weight and installation space.

The damping body 44 also comprises a short tubular (and hence in particular hollow) sound tube 50, which is shaped in one piece to a front longitudinal end 52 of the pocket 46 which is opposite the longitudinal end 48. In the assembled position of the receiver 28, a sound outlet of the receiver 28 is arranged in the region of the front longitudinal end 52 of the pocket 46 such that the sound generated by the receiver 28 is output into the sound tube 50.

To reproduce the first curvature of the canal portion 8, the sound tube 50 is positioned on the pocket 46 obliquely to the longitudinal axis of the pocket 46—in a manner corresponding to the first angle W1. The second curvature of the canal portion 8 is not reproduced in full on the damping body 44. Instead, at its end distant from the pocket 46, the sound tube 50 terminates in a support plate 54, which is placed at an angle to the axis of the sound tube 50. By way of the support plate 54, the sound tube 50 rests all round on a shoulder 56 of the canal portion 8 (formed on an inner wall of the canal portion 8). As a result of the oblique alignment of the support plate 54, the sound tube 50 in this case extends obliquely—in a manner corresponding to the second angle W2—to the end of the canal portion 8 formed by the connector 22. As a result of the support plate 54 resting on the shoulder 56, the transition between the sound tube 50 of the damping body 44 and the connector 22 of the housing 4 is also acoustically sealed. In this case, the damping body 44 lies in the canal portion 8 in substantially stress-free fashion; in particular, it is not significantly compressed nor expanded nor bent nor twisted nor sheared in the assembled position.

As evident from FIGS. 9 to 12 in particular, the support plate 54 is broadened vis-à-vis the sound tube 50. It thus has an outer edge which projects beyond an outer circumference of the sound tube 50. As a result, the support plate 54 fills the hollow inner cross section of the canal portion 8 virtually completely in the region of the shoulder 56; however, the outer diameter of the support plate 54 preferably is slightly smaller (in particular by approx. 10%) than the locally corresponding inner diameter of the canal portion 8. Thus, the lower end of the damping body 44 is centered without further measures (self-centered) by the broadened support plate 54 in the canal portion 8 of the housing 4 without the damping body 44 being clamped or even compressed by the housing wall. Moreover, the sound tube 50 is guided at a distance from the housing wall all round.

Figure 10:
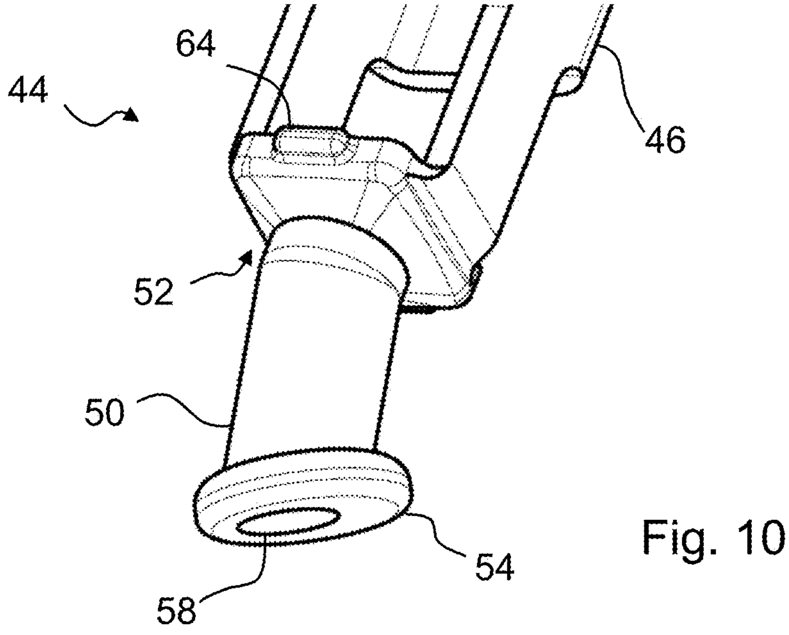
FIG. 10 shows a further perspective illustration of a sound tube of the damping body from FIG. 9.
Figure 11:
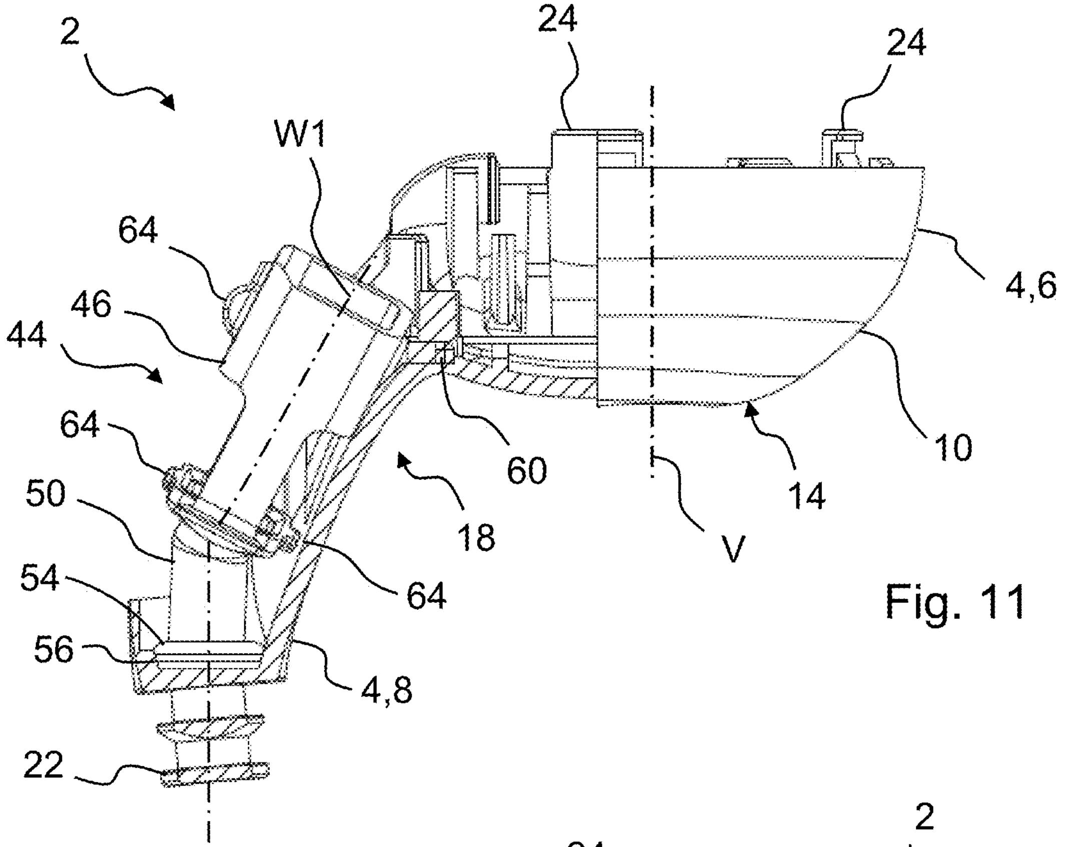
FIG. 11 shows, in an illustration according to FIG. 2, the hearing instrument therefrom with a removed housing lid, a housing trough depicted in cut open fashion, and the damping body inserted in the housing trough.
Figure 12:
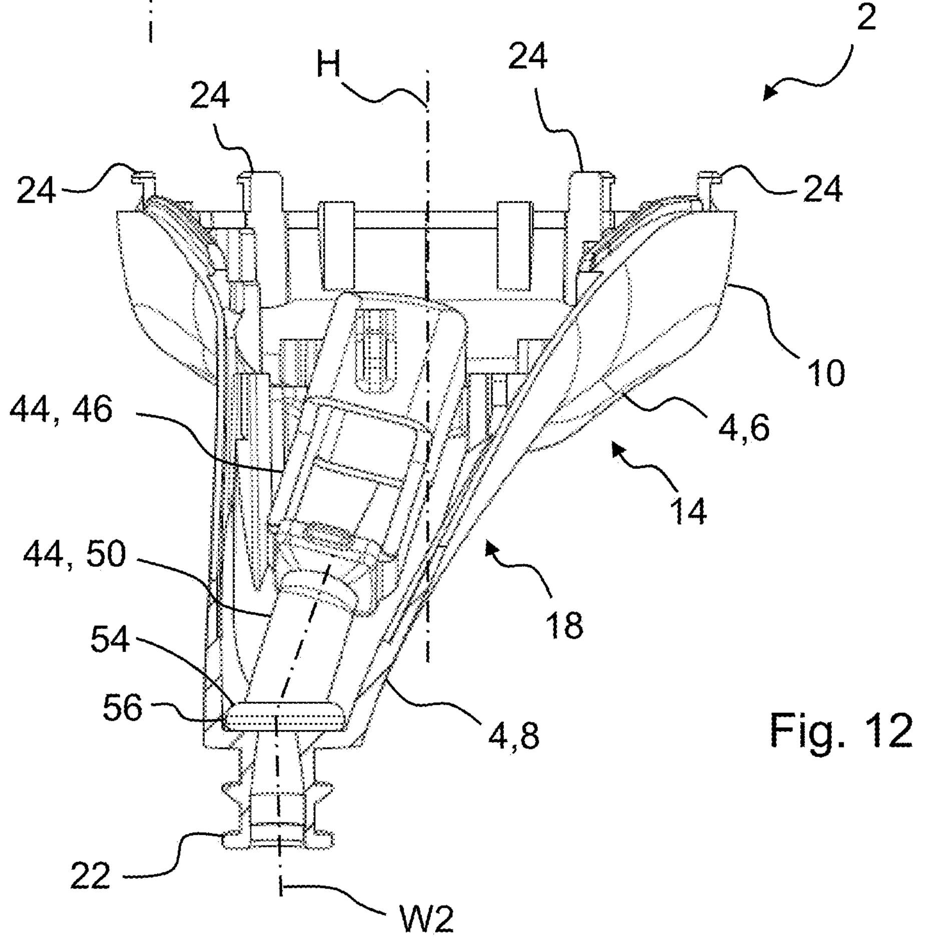
FIG. 12 shows, in an illustration according to FIG. 3, the hearing instrument therefrom with a removed housing lid, a housing trough depicted in cut open fashion, and the damping body inserted in the housing trough.

A sound channel 58 formed in the sound tube 50 passes through the support plate 54 off-center in accordance with FIG. 10 and opens substantially without transition into an adjoining sound channel of the connector 22.

In addition to the support on the housing 4 brought about by the support plate 54 resting on the shoulder 56, the damping body 44 is secured to the housing 4 only by way of a T-shaped retaining projection 60. To this end, the elastic retaining projection 60 formed on the pocket 46 at the lower side of the longitudinal end 48 (consequently opposite to the support plate 54 and on the inner side in relation to the bend of the damping body 44) is pressed into a retaining contour 62 of the housing trough 10, which frictionally and interlockingly fixes the retaining projection 60. The retaining contour 62 preferably encloses a crossbar of the T-shaped retaining projection 60 (i.e., the "roof" of the T shape) from both sides.

In its rest position, the damping body 44 is not in contact with the housing wall in the region between the retaining projection 60 and the support plate 54. However, the damping body 44 is additionally provided with a plurality of lugs 64 which project outwardly from the pocket 46 (specifically in the direction of the lower side 18 and the upper side 20 of the canal portion 8 in the assembled position), which are formed by the elastic material of the damping body 44 and which buffer the damping body 44 vis-à-vis the housing wall if said damping body is deflected more significantly from the rest position under the action of inward or outward accelerations. By preference, the lugs 64 are not in contact with the housing wall in the rest position and in the case of only minor deflections of the damping body 44 (FIG. 14).

As a result of the damping body 44 being fixed to the housing 4 only at the support plate 54 and the retaining projection 60, it can move largely freely in the lateral direction (i.e., across its longitudinal direction).

The electronics unit 40 is connected to the concha portion 6 of the housing 4 only at three locations, specifically by way of two elastic sealing rings 66, which are each arranged flush with one of the two microphones 26 and inserted between the respective microphone 26 and the housing lid 12, and by way of a further elastic sealing ring 68, which surrounds the charging connector 34. The sealing rings 66 and 68 firstly serve to seal the interior of the housing 4 with regard to moisture, dirt and sound vis-à-vis the surroundings in the region of a respectively assigned housing opening (as a sound inlet for an assigned microphone 26 in each case or as an access opening for the charging connector 34). Additionally, the three sealing rings 66 and 68 serve as cushioning elements which effectively decouple the electronics unit 40 from vibrations transmitted via the housing 4 (in particular the structure-borne sound generated by the receiver 28). Thus, the electronics unit 40 is suspended virtually in floating fashion (i.e., without hard contact) in the concha portion 6 of the housing 4 as a result of having only the three connecting locations with the housing 4.

Figure 15:
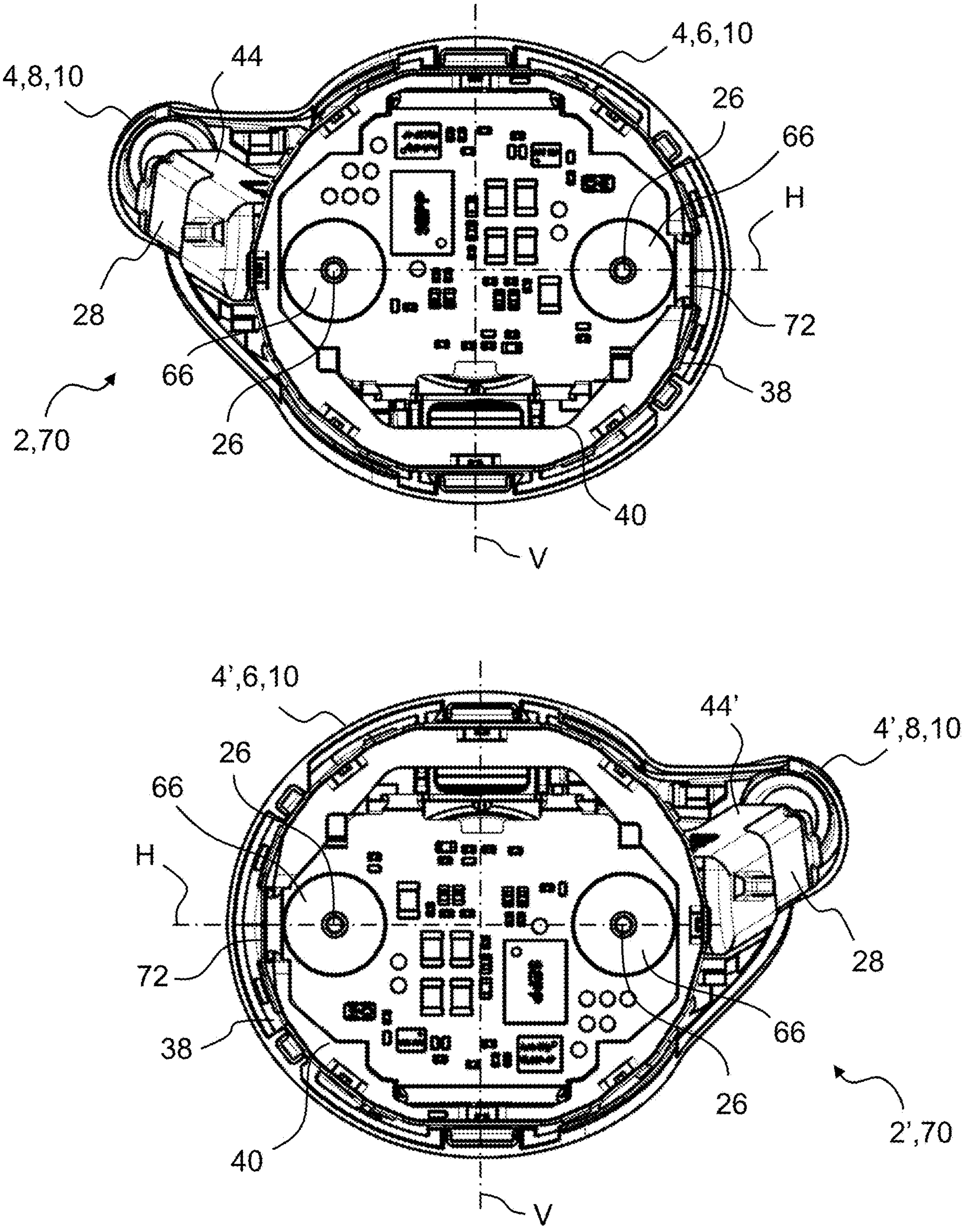
FIG. 15 shows, in an illustration according to FIG. 4, a binaural system having the hearing instrument according to FIG. 1 and a further hearing instrument for the right ear of the user.

FIG. 15 finally shows a binaural hearing system 70 which is formed by the hearing instrument 2 according to FIGS. 1 to 14 and a further hearing instrument 2' for the right ear of the user.

The hearing instrument 2' depicted in FIG. 15 without the housing lid has a housing 4' with a mirror symmetric design (specifically reflected in the vertical plane V) vis-à-vis the housing 4 of the hearing instrument 2. Additionally, the hearing instrument 2' also has a damping body 44' with a mirror symmetric design vis-à-vis the damping body 44 of the hearing instrument 2.

The remaining components, especially the receiver 28 and the electronics unit 40, have an identical design in both hearing instruments 2 and 2'. However, the electronics unit 40 of the hearing instrument 2' is installed into the housing 4' in a pose that is rotated through 180° about the central axis Z (i.e., in the plane of the drawing of FIG. 15) in comparison with the electronics unit 40 of the hearing instrument 2.

The use of identical electronics units 40 for the left hearing instrument 2 and the right hearing instrument 2' is promoted by virtue of the fact that—as emerges from FIGS. 4 and 8 in particular—both microphones 26 are arranged in the horizontal plane H and in centered fashion in relation to the latter, with the result that the corresponding microphones 26 of both hearing instruments 2 and 2' have a corresponding pose and hence a corresponding spatial recording region in the wearing position on the left and right ear of the user, respectively. Moreover, the use of identical electronics units 40 for the left hearing instrument 2 and the right hearing instrument 2' is also promoted by virtue of the fact that a base point 72 (i.e., a central feeding point) of the antenna 38 is also arranged on the electronics unit 40 in the horizontal plane H and in centered fashion in relation to the latter (see FIGS. 4 and 8). The effect obtained thereby is that the base points 72 of the antennas 38 in both hearing instruments 2 and 2' are arranged in an appropriate pose in the wearing position, whereby an appropriate emission characteristic is obtained for both antennas 38.

The invention becomes particularly clear on the basis of the exemplary embodiment described above; however, it is in no way restricted to this example and, instead, further exemplary embodiments of the invention can be derived within the scope of the claims from the description given above. In particular, the invention is not restricted to hearing aids but can be applied in general to hearing instruments wearable in the ear.

LIST OF REFERENCE SIGNS

2, 2' Hearing instrument
4, 4' Housing
6 Concha portion
8 Canal portion

10 Housing trough
12 Housing lid
14 Lower side
16 Upper side
18 Lower side
20 Upper side
22 Connector
24 Latching connection
26 Microphone
28 Receiver
30 Battery
32 Signal processor
34 Charging connector
38 Antenna
40 Electronics unit
42 Electronics frame
44, 44' Damping body
46 Pocket
48 (Back) longitudinal end
50 Sound tube
52 (Front) longitudinal end
54 Support plate
56 Shoulder
58 Sound channel
60 Retaining projection
62 Retaining contour
64 Lug
66 Sealing ring
68 Sealing ring
70 Hearing system
72 Base point
H Horizontal plane
V Vertical plane
W1 Angle
W2 Angle
Z Central axis

The invention claimed is:

1. A hearing instrument, comprising:

a housing being wearable in an ear of a user in an intended wearing position of the hearing instrument, said housing including a concha portion and a canal portion being thinner than said concha portion and protruding from said concha portion;

a mechanically rigidly connected electronics unit including a battery, a signal processor and two microphones;

a receiver;

said electronics unit being accommodated in said concha portion, said electronics unit having an upper side facing away from the head of the user and a lower side facing the head of the user, in the intended wearing position;

each of said two microphones being disposed on said upper side of said electronics unit and centered relative to a horizontal plane, said horizontal plane being aligned approximately parallel to a transverse plane of the head of the user in the intended wearing position and intersecting said concha portion centrally; and an antenna disposed in said electronics unit for an electromagnetic data transfer, said antenna having a base point centered on said electronics unit relative to said horizontal plane.

2. The hearing instrument according to claim 1, wherein said base point of said antenna is disposed on an edge of said upper side of said electronics unit distant from said canal portion of said housing.

3. The hearing instrument according to claim 1, wherein:

said battery is rechargeable;

an electrical charging connector for charging said battery is disposed in said electronics unit; and said charging connector is centered relative to said horizontal plane.

4. The hearing instrument according to claim 3, wherein said charging connector has an axially symmetrical configuration.

5. The hearing instrument according to claim 1, wherein said receiver is accommodated at least partially in said canal portion separately from said electronics unit.

6. A binaural hearing system, comprising:

first and second hearing instruments each being constructed according to claim 1;

one of said first and second hearing instruments being configured for the right ear and another of said first and second hearing instruments being configured for the left ear of the user;

said housings of said first and second hearing instruments being at least substantially mirror symmetrical; and said electronics units of said first and second hearing instruments being identically constructed.

7. The binaural hearing system according to claim 6, wherein said receivers of said first and second hearing instruments are identically constructed.

8. The binaural hearing system according to claim 6, wherein:

said housings of said first and second hearing instruments are disposed mirror symmetrically relative to one another; and said electronics units of said first hearing instrument and said electronics unit of said second hearing instrument are rotated through 180° relative to one another and inserted into said respective mirror symmetrical housings of said first and second hearing instruments.

* * * * *